(12) United States Patent
Kenney

(10) Patent No.: US 6,936,932 B2
(45) Date of Patent: Aug. 30, 2005

(54) SYSTEM AND METHOD FOR ELECTRICAL POWER GENERATION UTILIZING VEHICLE TRAFFIC ON ROADWAYS

(76) Inventor: Terry Douglas Kenney, 2055 Gateway Pl. Ste 400, San Jose, CA (US) 95110

( * ) Notice: Subject to any disclaimer, the term of this patent is extended or adjusted under 35 U.S.C. 154(b) by 153 days.

(21) Appl. No.: 10/428,998

(22) Filed: May 2, 2003

(65) Prior Publication Data

US 2004/0130158 A1 Jul. 8, 2004

Related U.S. Application Data

(60) Provisional application No. 60/380,056, filed on May 6, 2002.

(51) Int. Cl.[7] .............................................. H02P 9/04
(52) U.S. Cl. ....................................................... 290/1 R
(58) Field of Search .......................... 290/1 R; 60/533, 60/668, 547.1, 491, 487, 325; 417/229; 704/154

(56) References Cited

U.S. PATENT DOCUMENTS

| | | | |
|---|---|---|---|
| 4,004,422 A | 1/1977 | Le Van | 60/533 |
| 4,081,224 A | 3/1978 | Krupp | 417/229 |
| 4,130,064 A | 12/1978 | Bridwell | 104/154 |
| 4,173,431 A * | 11/1979 | Smith | 417/229 |
| 4,211,078 A | 7/1980 | Bass | 60/413 |
| 4,213,714 A | 7/1980 | Jones et al. | 417/229 |
| 4,238,687 A | 12/1980 | Martinez | 290/1 |
| 4,322,673 A | 3/1982 | Dukess | 322/35 |
| 4,339,920 A * | 7/1982 | Le Van | 60/533 |
| 4,409,489 A | 10/1983 | Hayes | 290/1 |
| 4,418,542 A | 12/1983 | Ferrell | 60/668 |
| 4,739,179 A | 4/1988 | Stites | 290/1 |
| 5,634,774 A | 6/1997 | Angel et al. | 417/229 |
| 6,172,426 B1 * | 1/2001 | Galich | 290/1 R |
| 6,204,568 B1 | 3/2001 | Runner | 290/1 |
| 6,376,925 B1 * | 4/2002 | Galich | 290/1 R |
| 6,734,575 B2 * | 5/2004 | Ricketts | 290/1 R |
| 2003/0132636 A1 * | 7/2003 | Ricketts | 290/1 R |

* cited by examiner

Primary Examiner—Darren Schuberg
Assistant Examiner—Julio Gonzales
(74) Attorney, Agent, or Firm—H. Black P.E.

(57) ABSTRACT

The present invention relates to methods and systems for power generation including a method and system for electrical power generation by utilizing forces due to vehicle weights from traffic on roadways. An embodiment of the invention uses multiple compressible hydraulic cylinders of different types, the cylinders used being dynamically selected responsive to the various weights of the vehicles presenting.

7 Claims, 15 Drawing Sheets

FIG._2

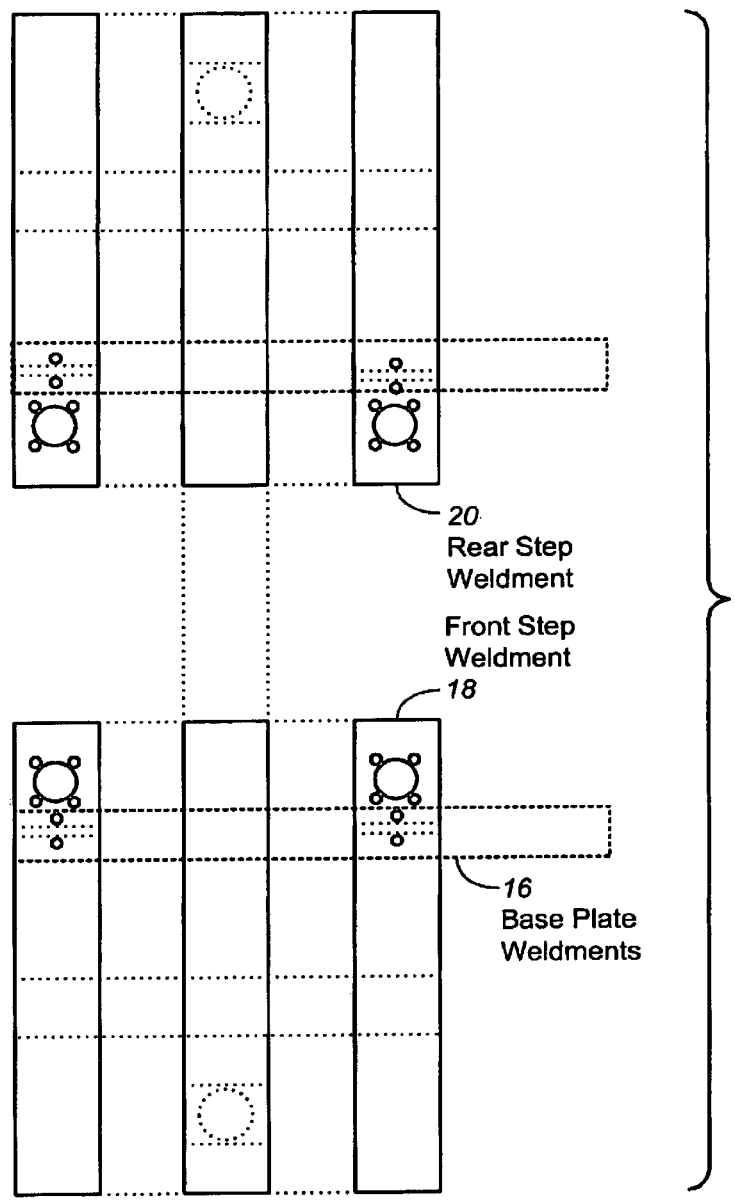
FIG._4
- 20 Rear Step Weldment
- Front Step Weldment 18
- 16 Base Plate Weldments
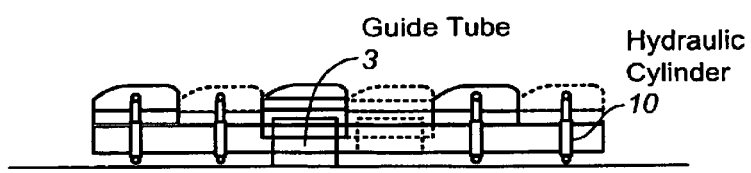
Guide Tube 3
Hydraulic Cylinder 10
FIG._5

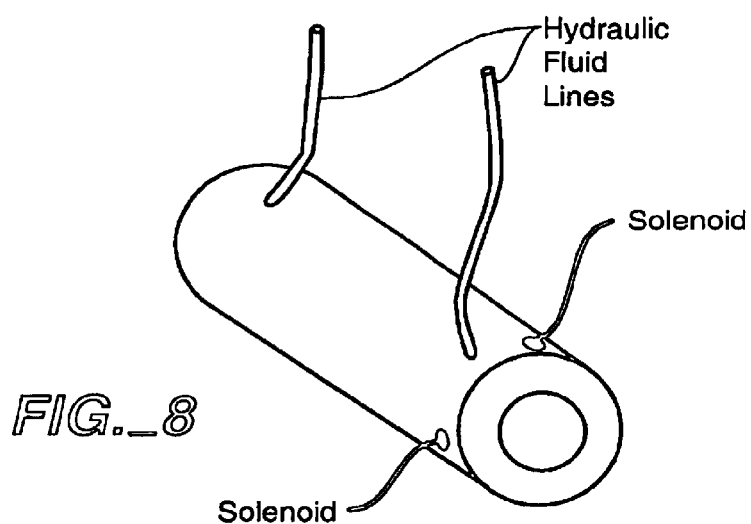
FIG._8
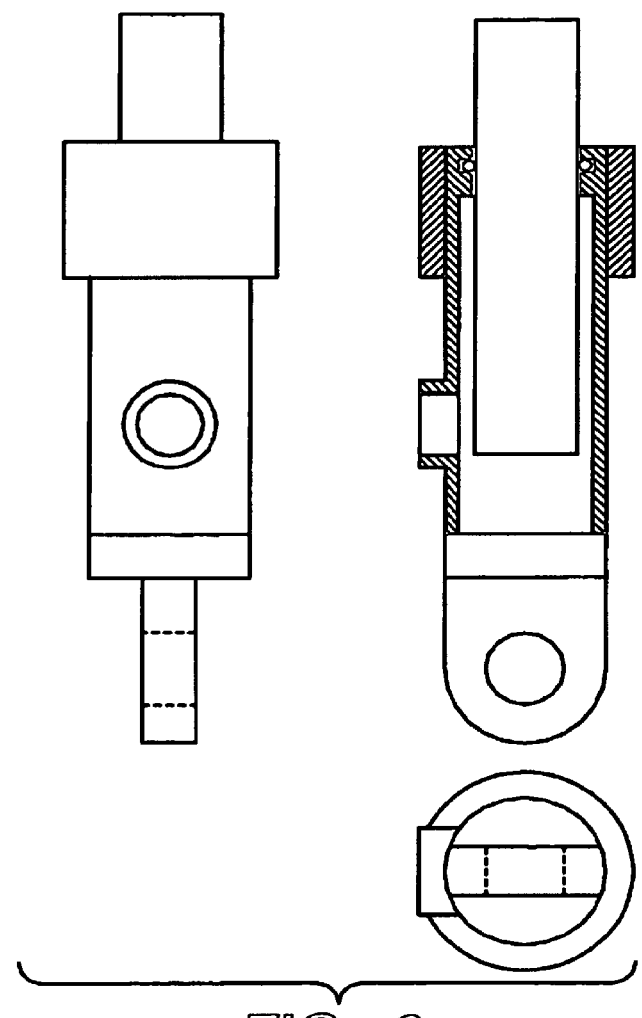
FIG._9

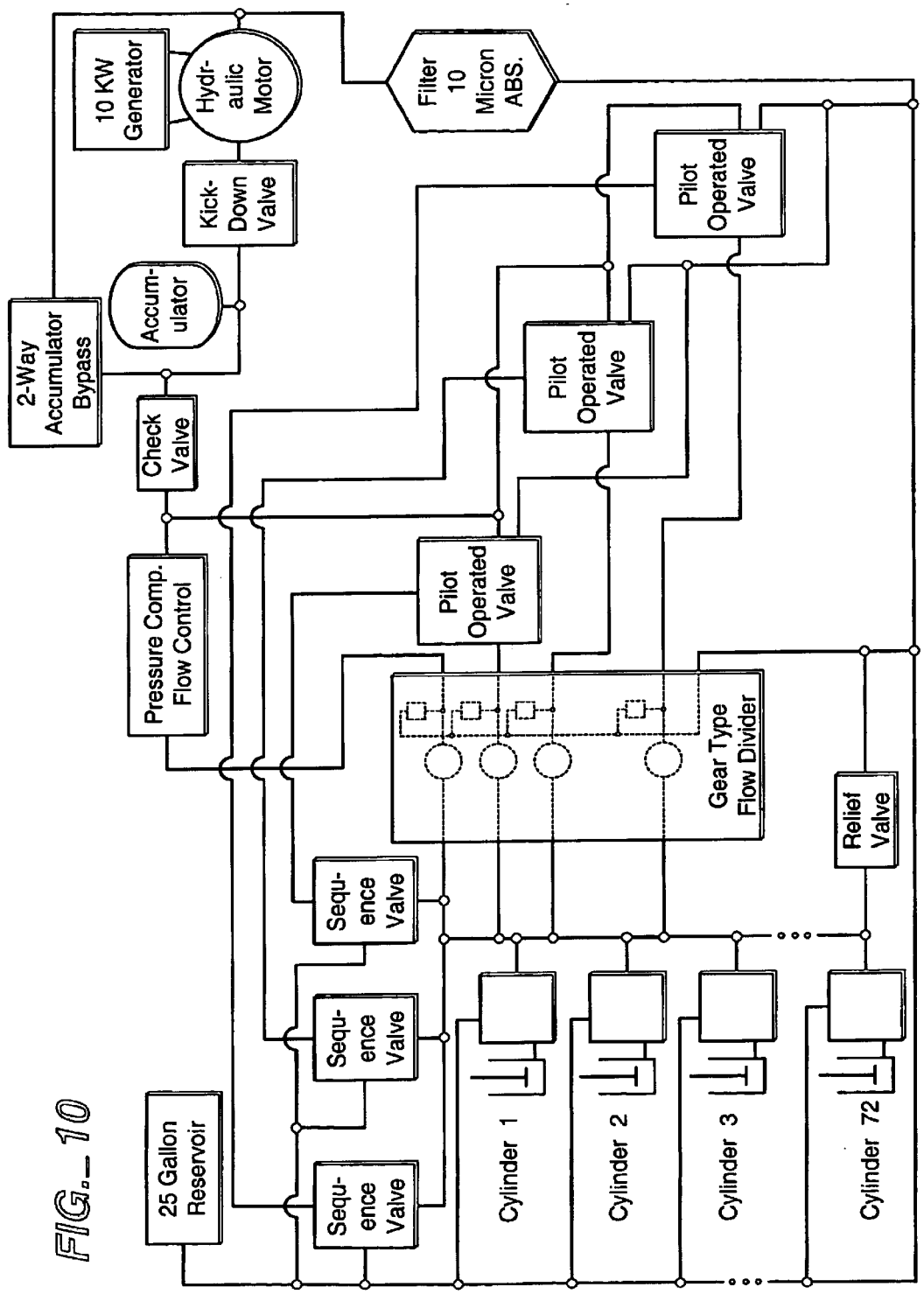
FIG._10

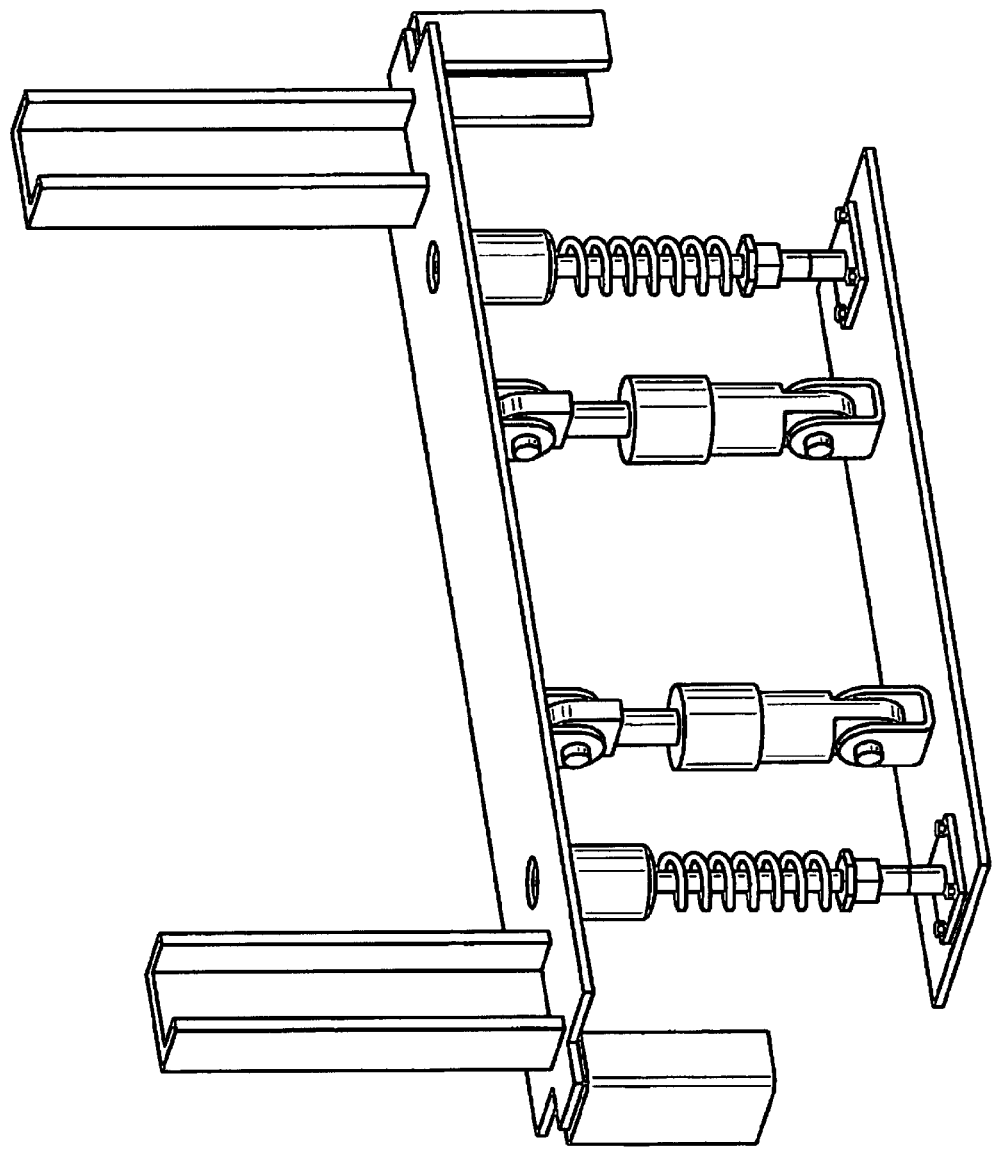
FIG._11

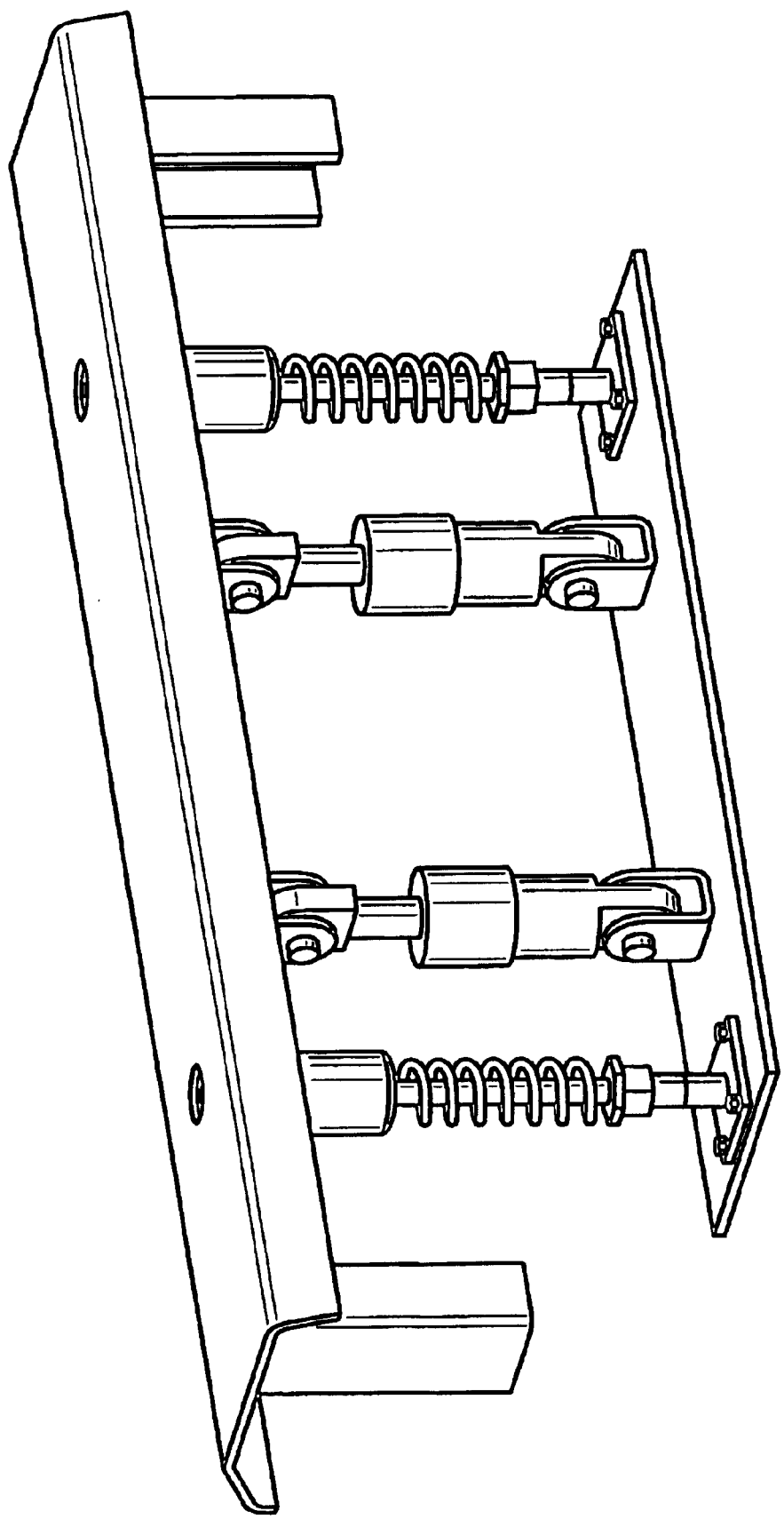
FIG._12

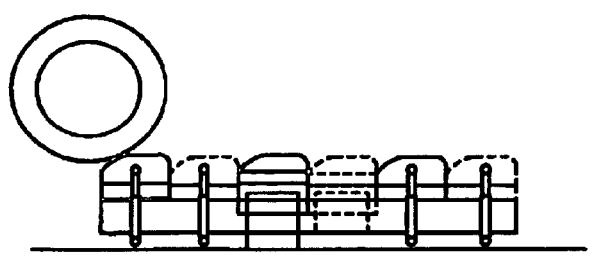
FIG._ 15A
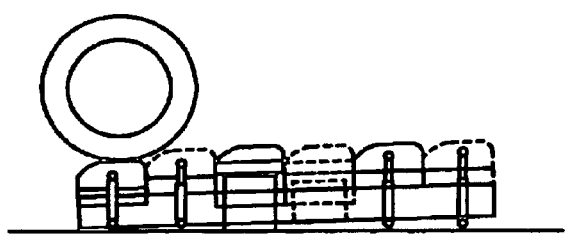
FIG._ 15B
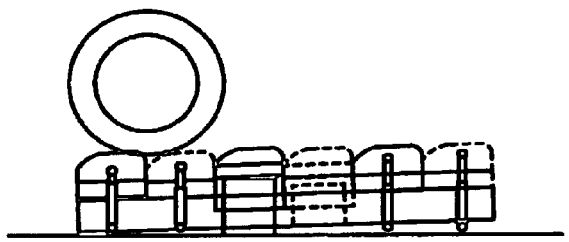
FIG._ 15C
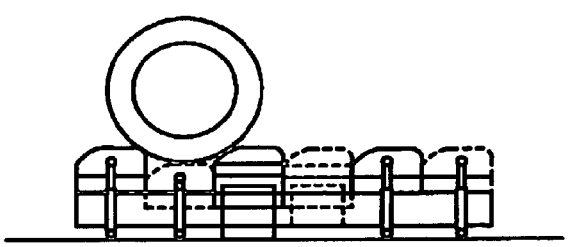
FIG._ 15D
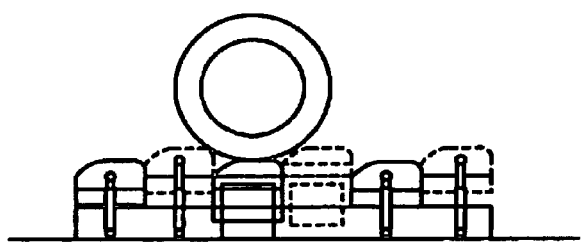
FIG._ 15E
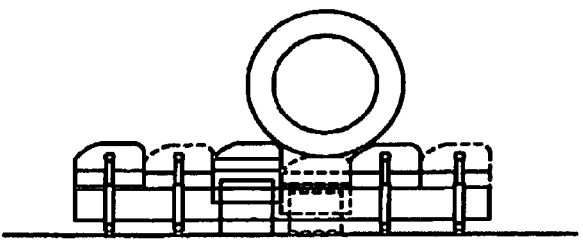
FIG._ 15F

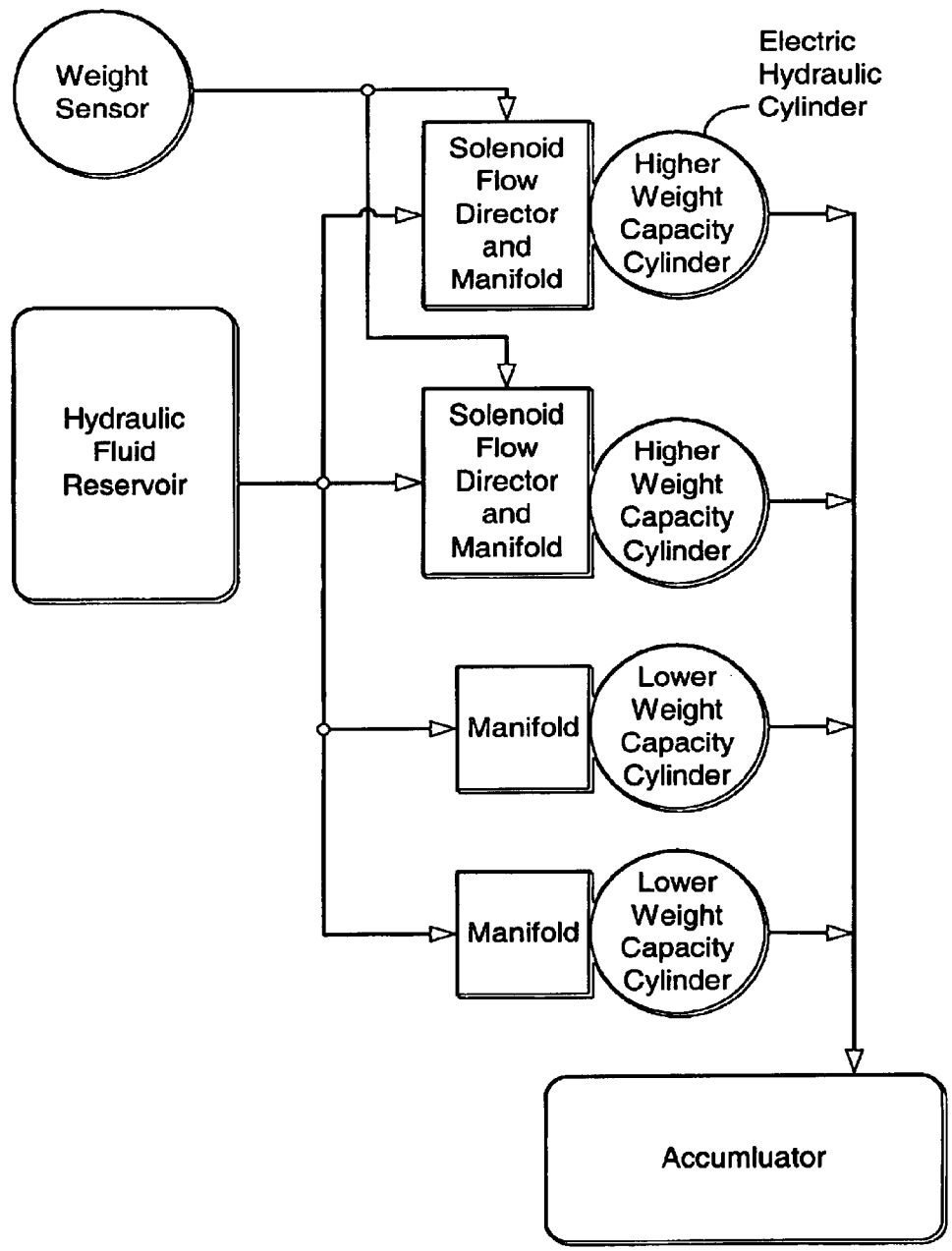
FIG._16

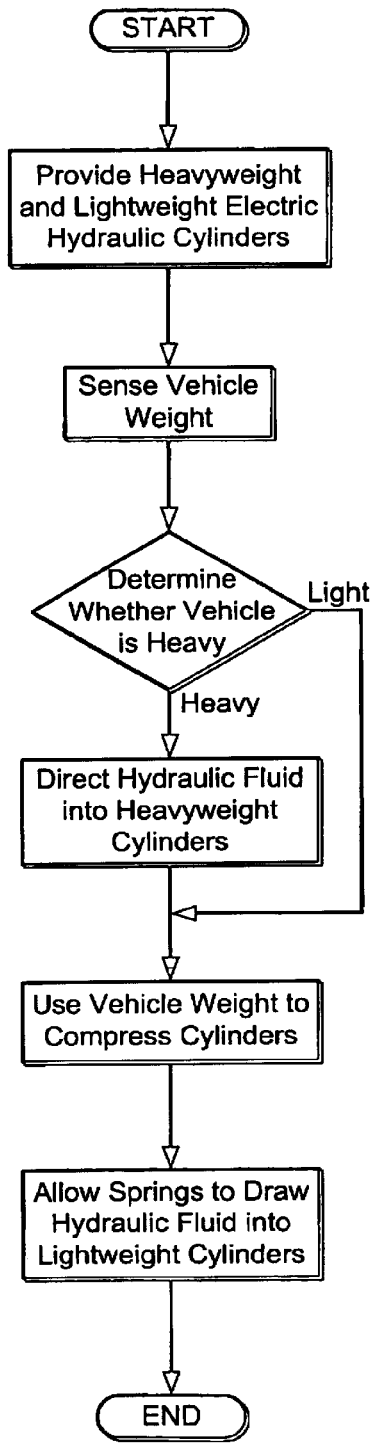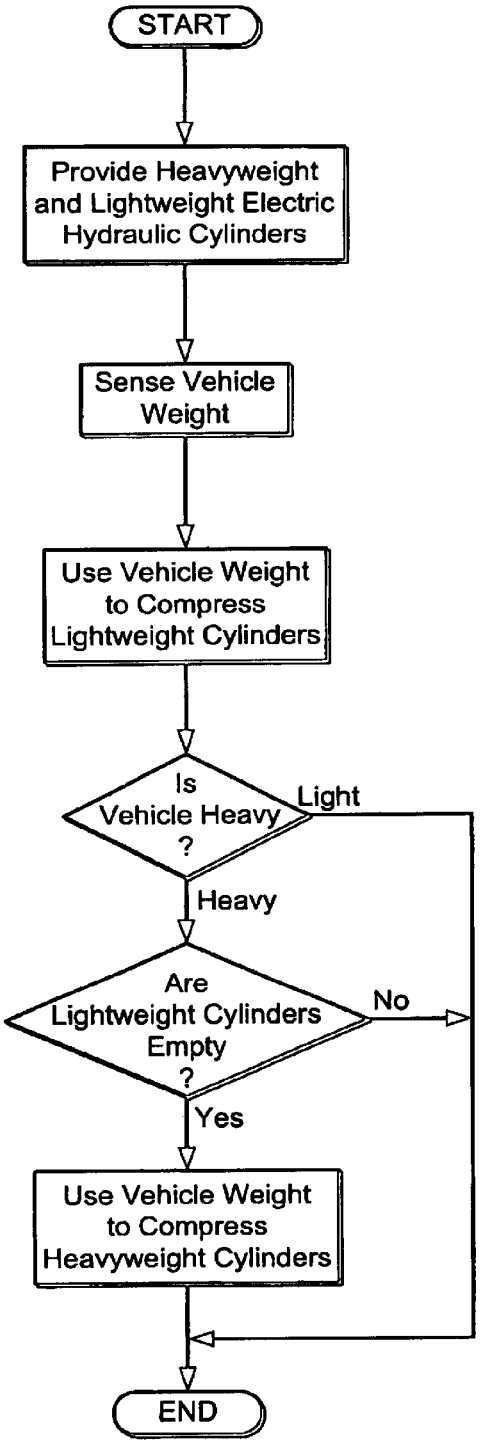
FIG._17A    FIG._17B

SYSTEM AND METHOD FOR ELECTRICAL POWER GENERATION UTILIZING VEHICLE TRAFFIC ON ROADWAYS

RELATED APPLICATION

This application claims priority to U.S. provision patent application No. 60/380,056 filed May 6, 2002 for inventor Terry Douglas Kenney also known as Terry Kenney.

TECHNICAL FIELD OF THE INVENTION

The present invention relates to methods and systems for power generation. More particularly, the present invention is a method and system for power generation including electrical power generation such as by utilizing vehicle traffic on roadways.

BACKGROUND AND RELATED ART

Energy sources useful for the generation of electricity include wind, water, solar, nuclear and steam energy and various methods and systems have been developed for harnessing such energy to generate electricity, typically by performing useful work to drive an electric generator.

With the continuing need for energy consumption efficiency and conservation, many efforts have been made to exploit previously unused energy sources. Many methods and systems have been proposed for the harnessing of existing forces or mechanical work to generate electrical power. In particular, several systems and methods have been developed to use the energy and downward force of the wheels of vehicles as they move along a roadway surface.

The systems can be categorized generally as mechanical systems, air compression systems and hydraulic systems.

Mechanical Systems.

Mechanical systems for generating electric power from the downward force of vehicles passing over a roadway typically involve gear mechanisms and other moving parts and are prone to wear and tear from the stress of forced downward movement in response to vehicles and forced upward movement when being reset. One example is U.S. Pat. No. 4,238,687 to Martinez discloses a system for generating electric power from the passage of motor vehicles over a roadway using turbines that are driven by the downward rotational movement of arc-shaped arms connected to rocker plates installed on a road surface when such rocker plates are forced down by vehicles passing over them.

Air Compression Systems.

Air compression systems typically involve an air compression piston being driven by an actuator of some sort that translates the downward force of a vehicle passing over a roadway in which the actuator is installed. For example, U.S. Pat. No. 4,173,431 to Smith discloses a road vehicle-actuated air compressor and system for using compressed air to operate an electrical generator to generate electricity. The road vehicle-actuated compressor includes an actuator that is pushed downward by the weight of vehicle tires passing over it, driving a reciprocating piston in a cylinder, compressing the air in the cylinder. An electric generator is driven by compressed air from the cylinder. Another example is U.S. Pat. No. 5,634,774 to Angel et al. which discloses a road vehicle actuated air compressor which utilizes flaps mounted in pairs in a road or pedestrian walkway surface. When traffic moves over the flaps, the flaps move downward to activate a piston which compresses air. The compressed air is stored and used as needed to generate electricity. Air compression systems, while generally somewhat more durable than mechanical systems, are not efficient in maximizing the amount of energy translated from the downward forces of moving vehicles to drive an electrical generator, due to friction and other losses.

Hydraulic Systems.

Several systems utilize hydraulic pumps to absorb the downward force of vehicles passing over a roadway and translate same into useful work, such as to drive an electric generator. For example, U.S. Pat. No. 4,004,422 to Le Van discloses a method and apparatus for producing useful work utilizing the weight of moving traffic by incorporating in a roadway or traffic-way a readily deformable chamber which is filled with a fluid, arranged so that the weight of the vehicle is passing over it causes displacement of the fluid contained therein. The energy of the displaced fluid in turn is translated into mechanical or electric energy. U.S. Pat. No. 4,130,064 to Bridwell discloses a system for utilizing the weight and momentum of moving vehicles to produce usable energy comprising a fluid displacement pump positioned either under a moveable plate in a roadway or between the rail in a railbed in a railway which compresses hydraulic fluid as the vehicle passes over, a low pressure line for supplying fluid to the pump chamber, a high pressure outlet line communicating with the chamber and connected to a manifold which is supplied with high pressure fluid from a number of other similar pumps and which directs the fluid to an energy conversion device such as a fluid motor and electric generator. The invention teaches use of a dual-stroke pump actuated depending on the weight of the passing vehicles. The dual-stroke pump allows greater volumes of hydraulic fluid to be pressurized depending on the weight of the passing vehicle.

Similarly, U.S. Pat. No. 4,211,078 to Bass is directed to a power source comprising a cylinder arranged to pump hydraulic fluid into a pressure accumulator. The stored hydraulic fluid operates a hydraulic motor to drive an alternator to generate electric power. The cylinder can be a single acting cylinder having a piston rod depressed by the weight of passing traffic on a highway. The system uses an accumulator and a hydraulic motor which drives an alternator to generate electric power. U.S. Pat. No. 4,409,489 to Hayes discloses an apparatus which pressurizes fluid and causes it to flow by capturing energy dissipated by moving vehicles, comprising a network of collapsible bodies containing hydraulic fluid attached to a turbine generator system. The collapsible bodies are resilient tubes, preferably three-part structures made of elastic inner tubes with projections and outer sections of semi-rigid hose. The claimed improvement is in the use of a network of numerous collapsible bodies to capture more weight from passing vehicles.

More recent efforts include U.S. Pat. No. 6,172,426 to Galich discloses an energy platform system for generating electrical energy from the weight of a moving vehicle comprising a fluid bed containing a volume of fluid which is compressible by the weight of a moving vehicle driven over it. Fluid forced from within the bladder as a result of such compression passes through a circulation system where the moving fluid is used to drive a generator. The circulation assembly comprises an accumulator in fluid communication with the bladder, which receives the forced fluid and releases it at a specified pressure level. A hydraulic pump and reservoir are also used. The electrical generator is a linear generator, comprising an elongate cylinder having a hollow interior. The exterior of the cylinder has a coil around it. A rod is inserted within the cylinder and has a magnet slidably coupled to it. As the rod in the cylinder is moved by the hydraulic fluid, the magnet moves as well, causing an electrical current within the coil. U.S. Pat. No. 6,204,568 to Runner discloses a system for converting mechanical motion of vehicles into electrical energy, comprising a plurality of motion converter assemblies each including a rod which remains in communication with a vertical motion delivery mechanism through a gearing mechanism for rotating the rod in response to vehicle traffic passing over the system, a plurality of fluid pumps each connected to the rotating rod to generate pressurized fluid which in turn drives a turbine generator. The motion converter assemblies have a rectangular base and sides forming a box an are inserted in the road surface. The motion converter assemblies also have a pair of rectangular top plates that are pivotally connected at one end to one side of the motion connection assembly base, with springs urging the plates upward. The top plate has a vertical plate pivotally connected to its under side which has teeth to engage a gear. When a vehicle passes over the top plate of a motion converter assembly, the vertical plate is driven downward and engages the gear, which rotates and drives the fluid pumps.

These previously described systems, while in principle capable generating electrical power from the downward force of vehicles as they pass over a roadway, are inefficient in their ability to maximize the electrical power generated from each passing vehicle. Vehicles have varying weights; the downward force of a semi-truck is obviously considerably more than that of a compact car. Prior systems do not effectively harness the full force of each vehicle. Additionally, because vehicle traffic is typically irregular, there is an increased need in such a system to maximize the transfer of energy from each vehicle and store energy to provide a steady supply of electric power. An embodiment of the present invention is a system and method for generating power, such as electrical power, from downward vehicle forces on a roadway that effectively harnesses the energy of vehicles of varying weights. Embodiments of the present invention may overcome the shortcomings of prior efforts by employing multiple hydraulic cylinders of different load bearing and hydraulic fluid compression capacities that are selectively activated by a sensor system depending on vehicle weight in a novel combination and configuration with a road plate over which vehicles pass. Embodiments of the present invention can effectively harness the downward force of both moving and stationary vehicles.

SUMMARY OF THE INVENTION

The invention includes methods and apparatuses for power generation systems. According to an aspect of the invention a power generation system comprises a hydraulic accumulator, a hydraulic reservoir; electric hydraulic cylinders having various weight-handling capacities and a vehicle weight sensor.

According to a further aspect of the invention, a method for power generation comprises providing electric hydraulic cylinders, sensing a weight, selecting cylinders and directing hydraulic fluid to them and using the weight to force hydraulic fluid.

According to a still further aspect of the invention a power generation system is disclosed. It may comprise a hydraulic fluid accumulator and a two level road plate.

BRIEF DESCRIPTION OF DRAWINGS

FIG. 4 is a top perspective view of certain elements of the road plate component of an embodiment of the system of the present invention in a preferred embodiment.

FIG. 5 depicts a side perspective view of certain elements of the road plate component of an embodiment of the system of the present invention in a preferred embodiment.

FIG. 8 depicts a side perspective view of an electric hydraulic cylinder of the road plate 25 component of an embodiment of the system of the present invention in a preferred embodiment.

FIG. 9 depicts a cross-sectional view of an electric hydraulic cylinder of the road plate component of an embodiment of the system of the present invention in a preferred embodiment.

FIG. 10 is a diagram of the hydraulic system of an embodiment of the present invention in a preferred embodiment.

FIG. 11 depicts a side perspective view of the bottom level road plate assembly used in a preferred embodiment of the invention utilizing a two-level road plate configuration.

FIG. 12 depicts a side perspective view of the top level road plate assembly used in a preferred embodiment of the invention utilizing a two-level road plate configuration.

FIG. 15 depicts the road plate action when a vehicle passes over it.

FIG. 16 is a block diagram that shows the relationship between some components of an embodiment of the invention.

FIG. 17 is a flow diagram for one or more embodiment of the invention.

For simplicity in description, identical components are labeled by identical numerals in this document.

DETAILED DESCRIPTION

Figure 1:
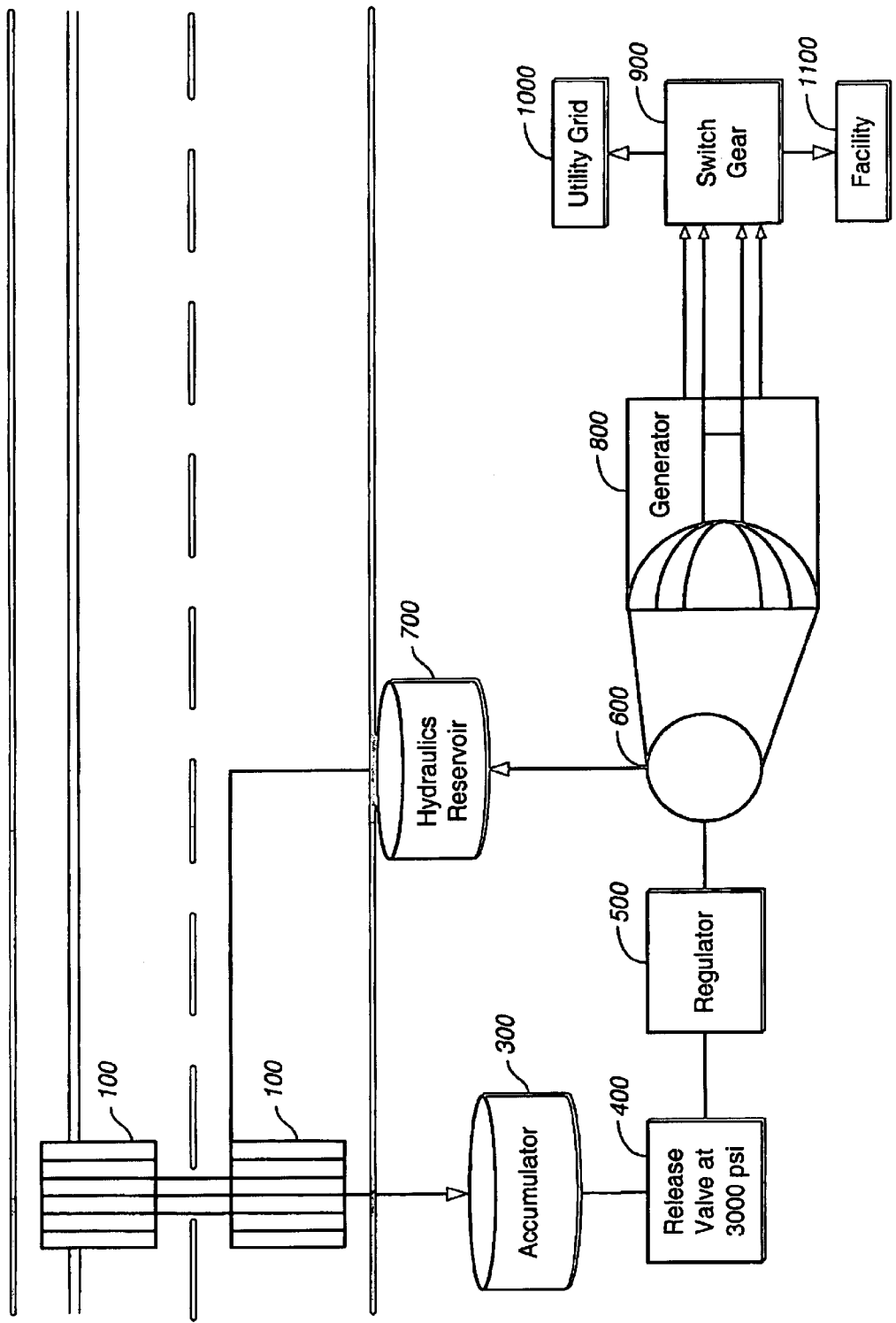
FIG. 1 is a diagram depicting certain components of an embodiment of the system of the present invention in a preferred embodiment.

In the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood and apparent to one skilled in the art.

An embodiment of the present invention provides a system and method for electrical power generation utilizing vehicle traffic on roadways. The system of the present invention, in a preferred embodiment may comprise several main components such as a road plate comprising one or more steps and/or arms having electric hydraulic cylinders disposed within them that are actuated when vehicles pass over the road plate and a vehicle weight sensor system that activates specific electric hydraulic cylinders of varying weight handling capacities depending on the vehicle weight sensed by such sensing system; a power generation system that may include a self-contained hydraulic system; and may include an electrical power transmission system.

Road Plate

Figure 7:
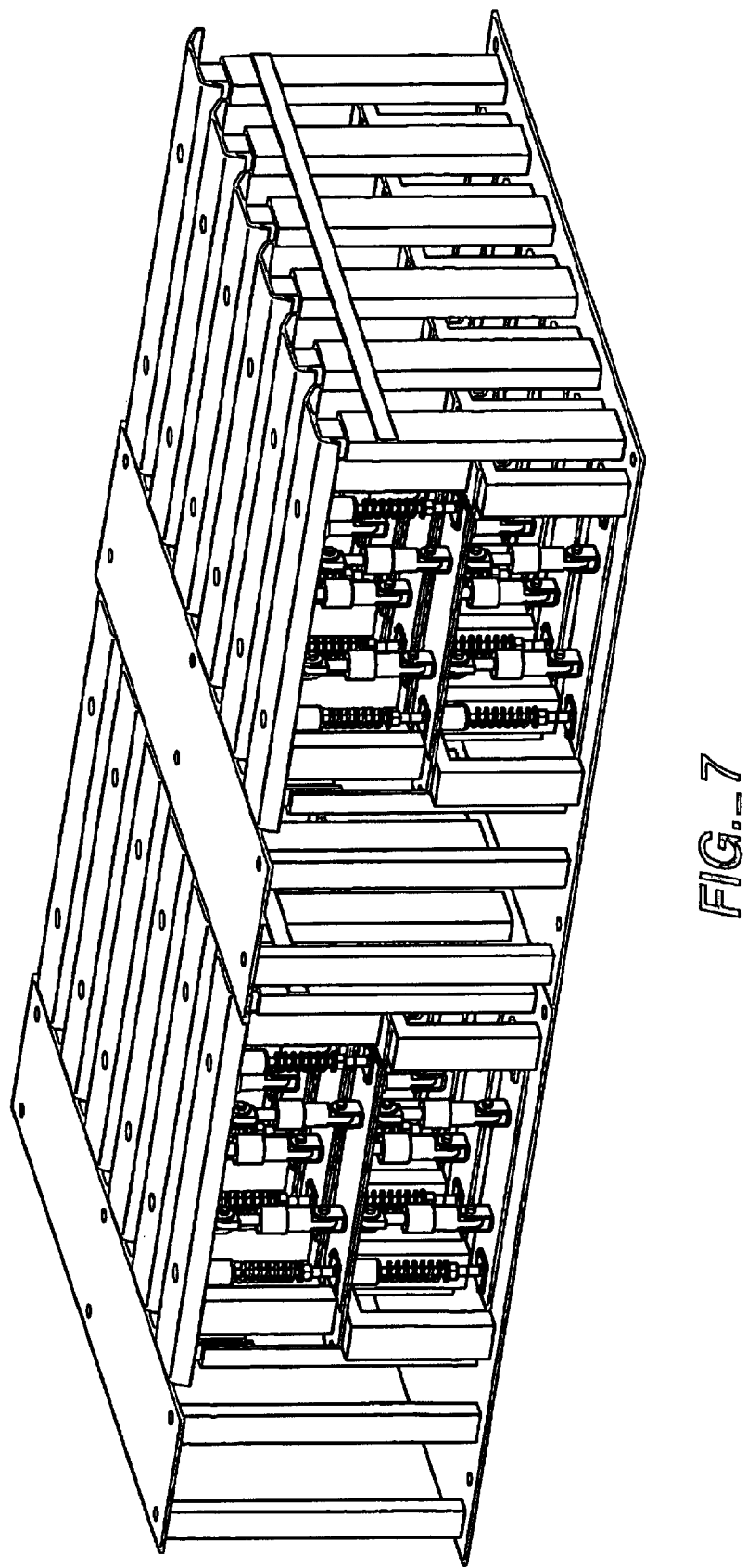
FIG. 7 depicts a side cross-sectional view of the road plate component of the system of an embodiment of the present invention in a preferred embodiment utilizing a two-level road plate configuration.
Figure 13:
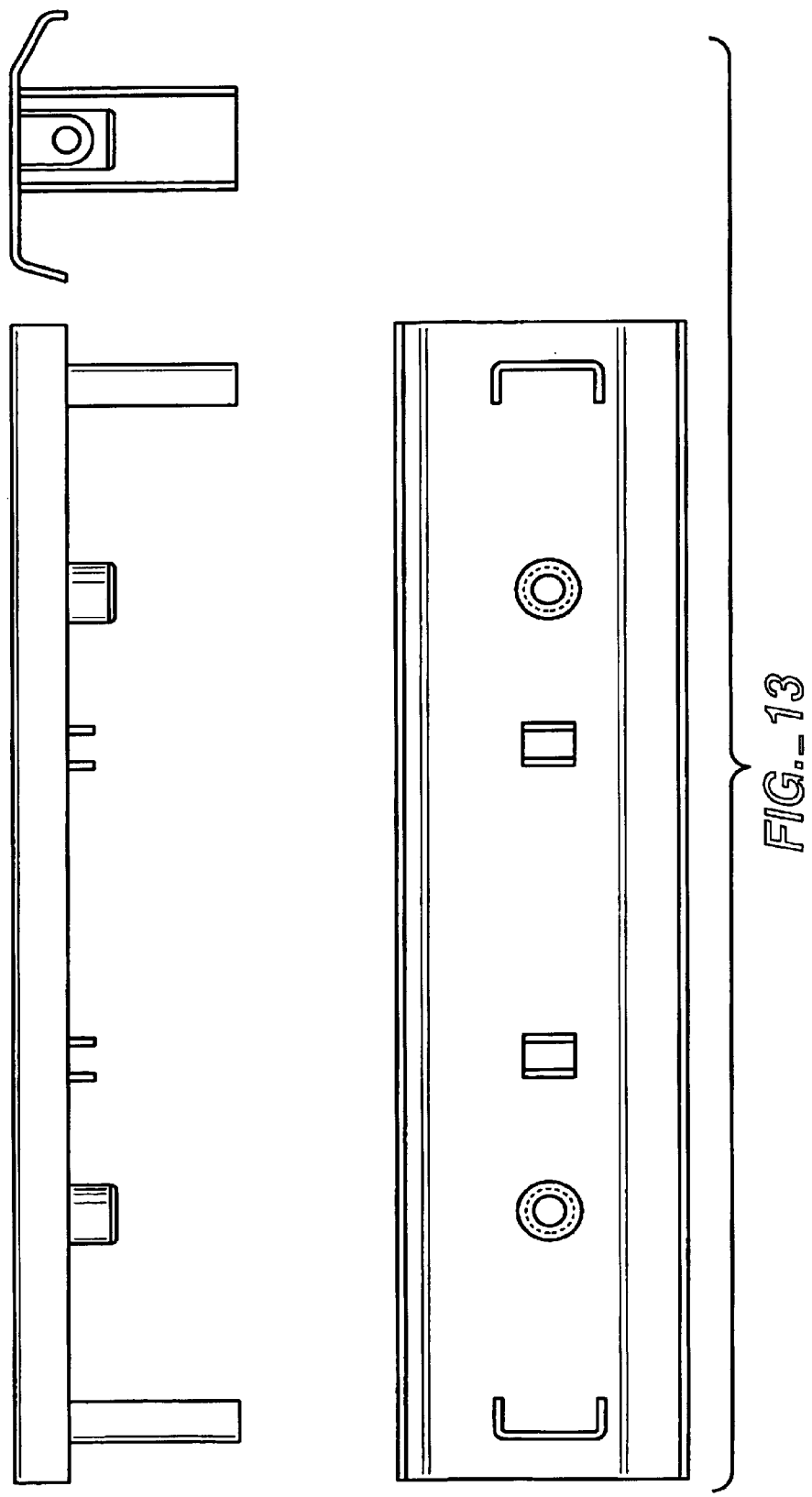
FIG. 13 depicts a side and top perspective view of the top level road plate weldment used 10 in a preferred embodiment of the invention utilizing a two-level road plate configuration.
Figure 14:
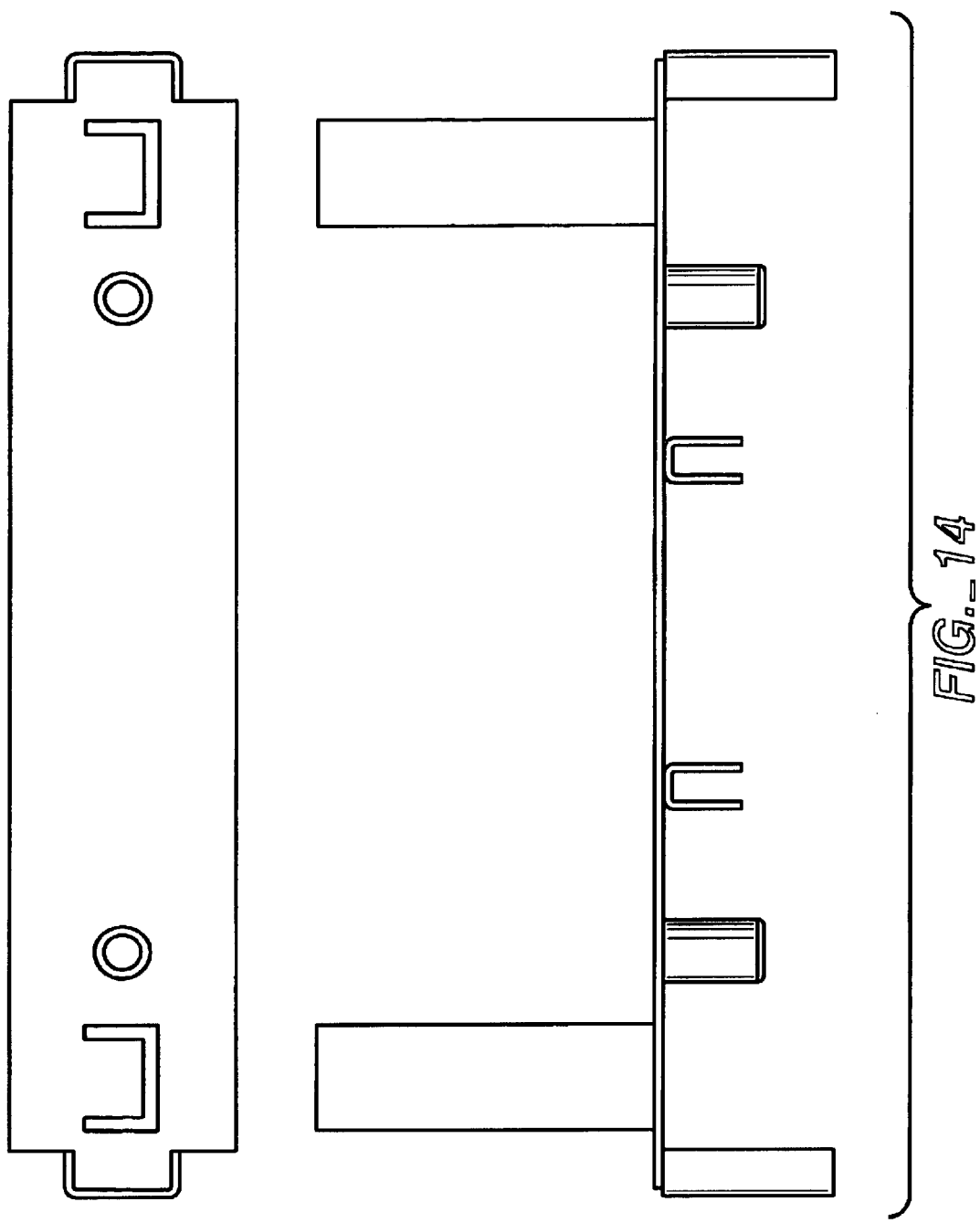
FIG. 14 depicts a side and top perspective view of the bottom level road plate weldment used in a preferred embodiment of the invention utilizing a two-level road plate configuration.

Referring to FIG. 1, which is a general block diagram of the overall system, the road plate component 100 is designed to capture the weight of vehicles passing over it. Multiple road plate components can be used. In one embodiment of the system as depicted in FIG. 7, a two-level road plate configuration is utilized, in which the lower level has higher compression capacity hydraulic cylinders that are activated depending on increased vehicle weight, with the upper level handling lower weight vehicles. FIGS. 11–14 depict the main top and bottom level road plate assembly components, showing the weldment assemblies with the level frames, springs, mounts, and hydraulic cylinders. Multiple level road plate configurations can be used in alternate embodiments of the invention.

Referring to FIG. 4, in a preferred embodiment, the road plate component comprises five main subcomponents: a front step weldment 18, a rear step weldment 20, a base plate weldment 16, aligned with the front step weldment and the rear step weldment and disposed underneath each, forming the base therefor, one or more hydraulic steps or arms, each having one or more electric hydraulic cylinders 10, and as depicted in FIG. 8 a vehicle weight sensor system that activates specific electric hydraulic cylinders of varying weight handling capacities depending upon the vehicle weight sensed by such sensing system. In a preferred embodiment, one or more piezo-electric traffic sensors may be utilized. Other known sensing mechanisms and systems can be utilized as well. The front step weldment 18 and the rear step weldment 20 may move independently of each other. Although the number of hydraulic cylinders can vary, each weldment is preferably attached to four electric hydraulic cylinders, with one at each corner. The base plate components are preferably constructed from welded aluminum or steel, although other rigid and durable materials such as plastics, fiberglass and other metals and composite materials can be utilized. Additionally, as depicted in FIG. 5, a guide tube 3 fits over another tube welded to the base plate 16. This guide tube 3 allows each front step weldment and rear step weldment to move vertically up and down, but not move side to side or front to rear. When a vehicle drives on top of a step, the cylinders are forced to retract. Coil springs are used in a preferred embodiment to force the front step weldment and the rear step weldment upward to their extended position after being forced down by passing vehicles. Shocks, struts and hydraulic return systems can also be used to perform this function.

Figure 3:
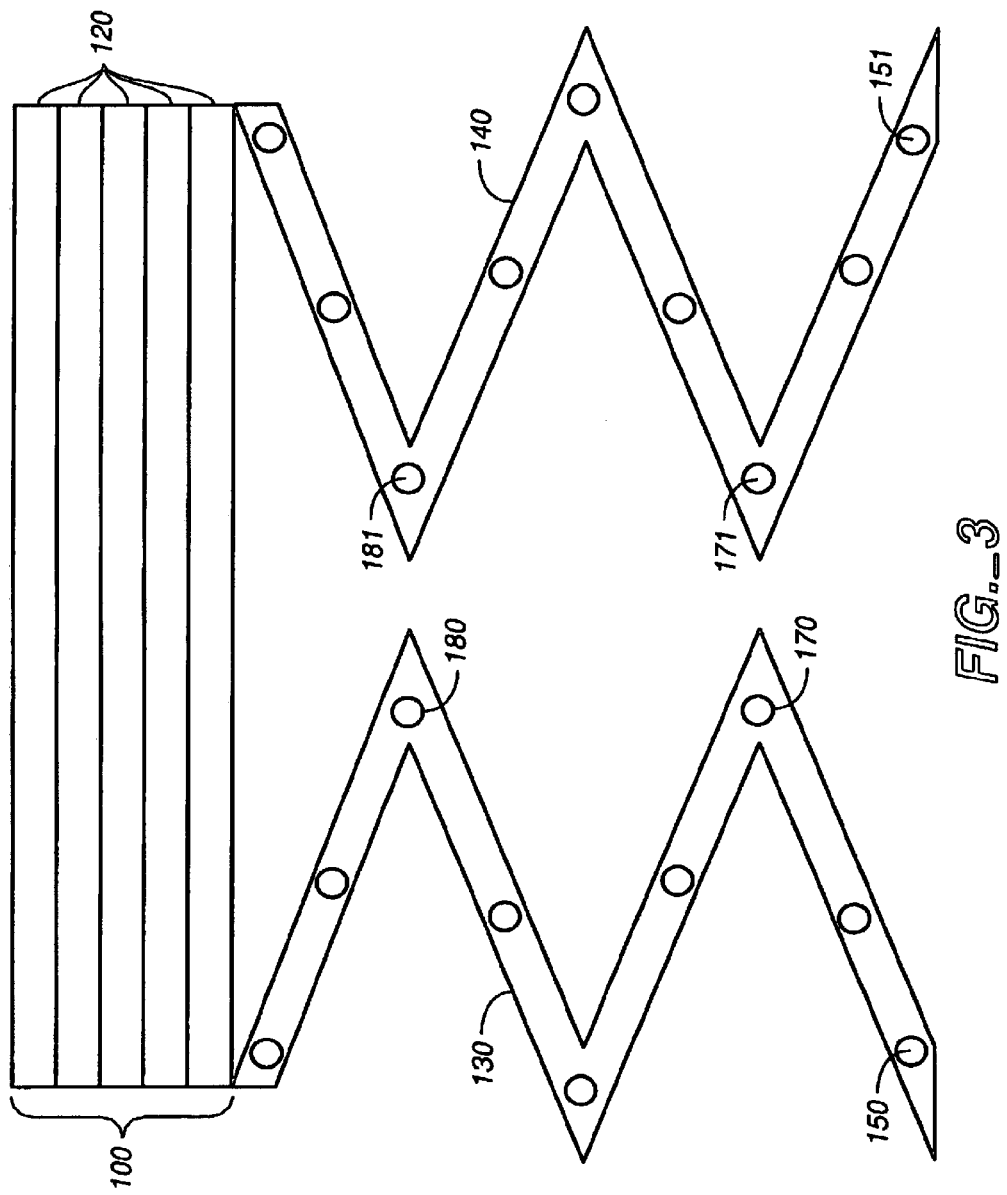
FIG. 3 is a top plan view of certain elements of the road plate component of an embodiment of the system of the present invention in a preferred embodiment.
Figure 6:
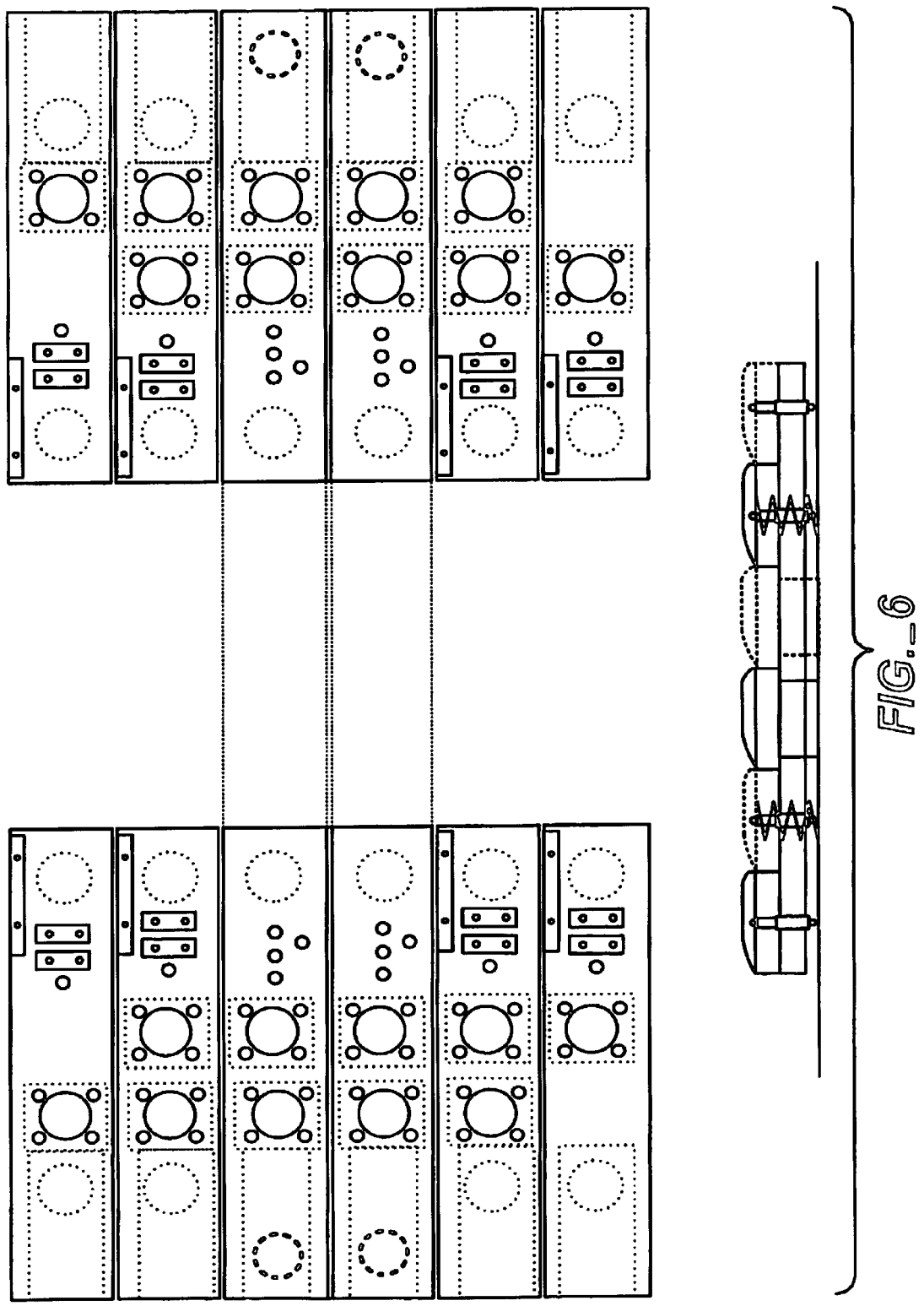
FIG. 6 depicts a side cross-sectional view of a step assembly of the road plate component of an embodiment of the present invention in a preferred embodiment.

Referring to FIG. 3, the hydraulic arms 130 and 140 used in combination with steps as 5 described above in a preferred embodiment in the road plate component, resemble railroad track rails in appearance, but have a base plate having a bottom and side walls and a top plate having a top and side walls that are configured to fit over the side walls of the base plate. Within the chamber formed in the space within the base plate and top plate are disposed one or more electric hydraulic cylinders which are connected via hydraulic fluid discharge lines to one or more hydraulic fluid accumulators forming part of the power generation system of the present invention described below. The electric hydraulic cylinders in the arms, as well as those in the steps, can be interconnected via hydraulic fluid lines in parallel, in series, or in other known configurations. Coil springs or other means as described above can be used in the arms to return the top plate to its extended position after being forced down by passing vehicles.

The layout of the hydraulic arms on the roadway surface may be a factor in the improved efficiency provided by the present invention. As depicted in FIG. 3, in a preferred embodiment, the arms 130 and 140 are configured in a "zigzag" pattern in a direction parallel to oncoming traffic, and are placed before the steps so that vehicle traffic passes over the arms before passing the steps. The layout and spacing of the electric hydraulic cylinders 150, 151, 170, 171, 180 and 181 within the arms can vary as desired for the specific application, but preferably the electric-hydraulic cylinders may be laid out within the "zigzag" pattern of the arms such that two or more electric hydraulic cylinders are aligned in parallel with vehicle traffic, at or near the road surface where vehicle tires typically make contact.

Referring to FIG. 8, the electric hydraulic cylinders themselves are preferably made of 25 metal or other materials known to be suitable for such applications, and have a piston slidably disposed within inner cylinder wall. FIG. 9 is a technical drawing of an example of one such supply line and a hydraulic fluid discharge line, as well as positive and negative electrical wires or cables connecting the electric hydraulic cylinder to the solenoid of the sensing system. Hydraulic fluid is supplied to fill the cylinder from the hydraulic fluid reservoir 700 of the power generation system component. The electric hydraulic cylinders are activated by the vehicle weight sensing system based on the vehicle weight sensed and when the sensed vehicle passes over the arms or steps within which the particular activated cylinder is disposed, the cylinder piston is forced downward in the cylinder forcing hydraulic fluid through the hydraulic fluid discharge line to the designated accumulator of the power generation system component.

As can be recognized, the number of electric hydraulic cylinders used, as well as their size and force handling capacity can vary and can be configured to meet the needs of the desired application. For example, a plurality of electric hydraulic cylinders can be interconnected to a single circulation assembly or manifold or can be connected to respective individual circulation assemblies or manifolds for redundancy of operation.

Vehicle Weight Sensing.

In one embodiment which uses piezoelectric sensors for vehicle weight sensing, the piezoelectric sensors may be installed as part of the road plate component in the road surface ahead of the hydraulic arms, and are used to sense vehicle weight and signal specific electric hydraulic cylinders to capture the full weight of, and maximize the power generated from, the passage of each vehicle over the road plate component.

Figure 2:
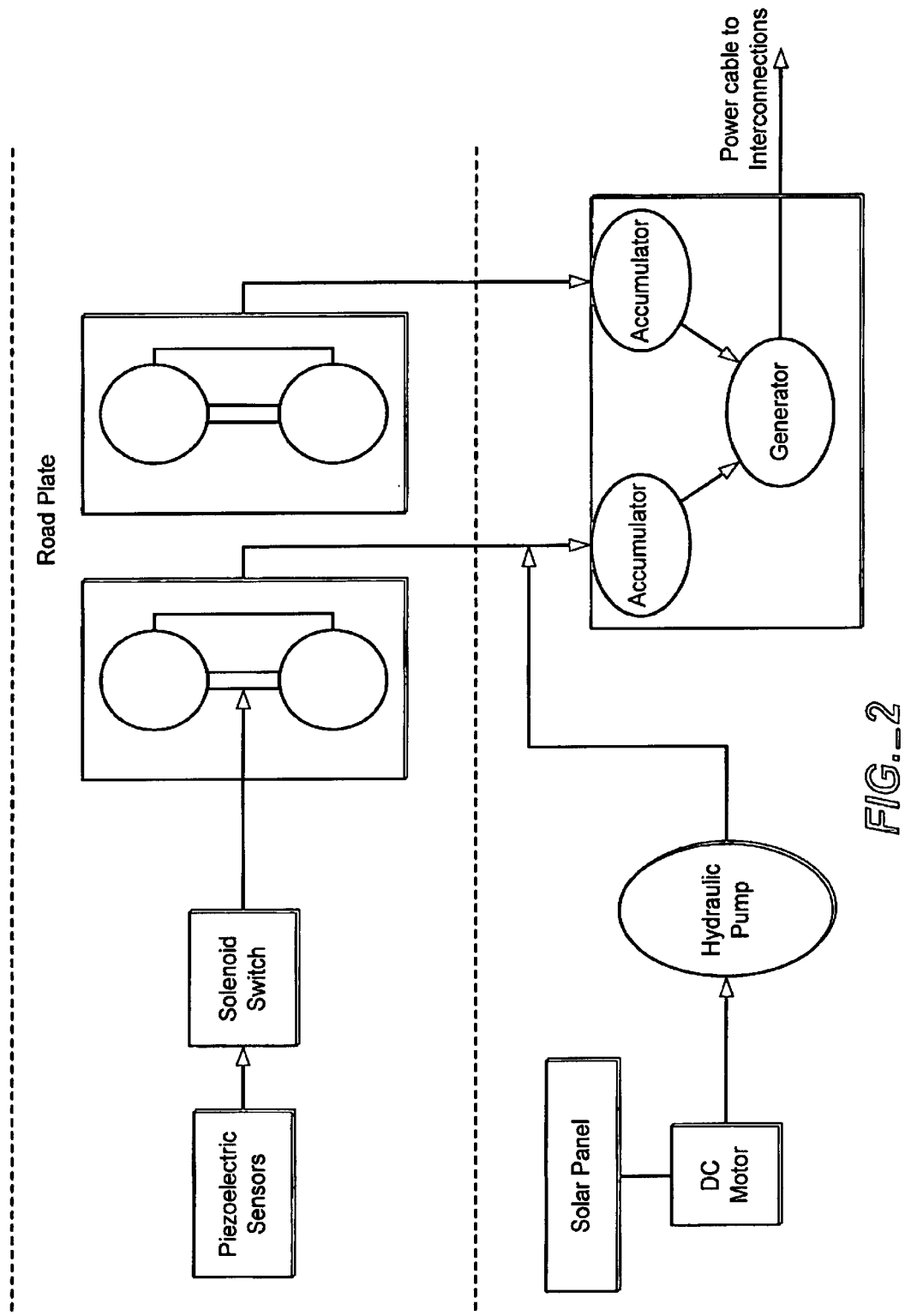
FIG. 2 is a diagram depicting additional detail regarding the layout of the components of an embodiment of the system of the present invention in a preferred embodiment.

Referring to FIG. 2, vehicles traveling on the roadway where the improved invention is installed first cross piezoelectric sensors, preferably approximately fifteen to twenty feet ahead of where the hydraulic arms are located. If a vehicle exceeds the pre-set weight, a signal will be sent by the sensor to activate specific electric hydraulic cylinders capable of capturing increased vehicle weight for maximum power generation. The signals may be controlled using an electric solenoid switch. The piezoelectric sensors are installed directly into the road in a manner that allows them to conform to the profile of the road. The sensors may also be used for counting vehicles in order to calculate maintenance and other performance data. Piezo-electric sensing systems such as the Roadtrax® Piezo-electric traffic sensors manufactured by Measurement Specialties, Inc. are suitable in embodiments of the system of the present invention, although other known traffic sensing systems can be used. Such sensors are only 1/16" thick and 1/4" wide, and can be installed with only 3/4" wide by 314"–1" deep slots in the road surface, minimizing the damage done to the road, speeding up installation and reducing the amount of grout needed for installation. The sensor can provide high signal output and good dynamic range. The flat construction of the sensor provides improved road noise rejection.

Piezoelectric polymer film provides high sensitivity, broad bandwidth and wide dynamic range. A cable form of sensor is preferably used, comprising piezopolymer extruded directly onto a stranded core wire, with conventional braid and jacket similar in appearance to a small coaxial signal cable. One of the inherent advantages of piezo cable over other forms of sensors is the ability of the cable to detect impacts or vibration ranging from very weak pressure signals caused by ground-borne vibration, through to impacts from heavy vehicle axles at high speed. The present invention utilizes this increased sensing capacity to maximize the energy harnessed from each passing vehicle.

As vehicles move across the arms containing hydraulic cylinders, the weight of the vehicle is captured by the electric hydraulic cylinders, which then feed pressurized fluid into the power generation system component of the present invention. As the vehicles move forward through the road plate component, the rear step weldment adjusts based on the piezoelectric weight sensor input to engage additional cylinders. The vehicles pass over the arms activating the hydraulic cylinders below and the downward force of the vehicle's weight forces hydraulic fluid to be pumped to drive the power generation system component. The piezoelectric sensors send a signal to a solenoid switch to direct the operation of a flow director to direct the flow of hydraulic fluid to the appropriate hydraulic cylinders based on the weight of vehicle. Various flow director manifold components available on the market can be utilized in the present invention. In one embodiment, an integrated hydraulic manifold flow divider manufactured by Moog, Inc. is used.

Power Generation System

FIG. 16 is a block diagram that shows the relationship between some components of an embodiment of the invention. FIG. 17 is a flow diagram for one or more embodiment of the invention.

Referring to FIG. 1, the power generation system component, in a preferred embodiment, comprises one or more accumulators 300 preferably with one acting as the main accumulator attached to the system to capture average weight of all traffic, and another accumulator connected to the hydraulic cylinders driven by the weight of more heavy vehicles; a hydraulic motor 600, and an electricity generator 800 driven by the hydraulic motor 600. The accumulators feed into one motor system. A pressure control/release 400 and regulator 500 control accumulation and release of hydraulic pressure. The accumulators pre-pressurized to a set limit, store the energy until maximum capacity is reached at which time they discharge, releasing 3000 or more pounds per square inch, turning the hydraulic motor 600. The hydraulic motor 600 operates based on the amount of pressure released and subsequent free flow, which turns a generator 800 to produce electricity. The accumulators are connected to the base plate's electric hydraulic cylinders by hydraulic fluid supply lines and connections. Each different weight of vehicle has the potential to generate a different amount of pressure in the hydraulic cylinders. This is captured and turned into a uniform pressure charging the accumulators. To accomplish this, a gear type flow divider is preferably used to intensify the pressure when a light vehicle passes over the road plate component. For example: a light vehicle passes over the mechanism and generates 500 PSI of pressure and 3.14 cu. inches of volume. The flow divider will reduce the flow to about 0.785 cu. inches but increase the pressure to 2000 PSI. Sequence valves sense the pressure generated by the vehicle and control the flow from each section of the flow divider accordingly. The accumulators start with a set precharge and increase in pressure to a desired setting. The kickdown valve 400 at the accumulator outlet opens when the desired pressure level is reached and spins the hydraulic motor 600 which turns the generator 800. The hydraulic motor also supplies hydraulic fluid to a hydraulic fluid reservoir 700 which in turn provides a supply of hydraulic fluid to re-fill the electric hydraulic cylinders.

Electrical Power Transmission System

The electrical power transmission system component, in a preferred embodiment, comprises a switch gear mechanism 900 and an electrical conduit junction communications with an electrical utility supply grid 1000. The generator 500 is connected by known electrical connection means through a switching gear 900 to an existing electrical facility junction box 1100 or electrical utility grid 1000 to supply electricity. To further enhance the generation of electricity, a solar panel can be added to the power plant component.

The solar panel feature is included as part of FIG. 2. The solar panel powers a DC motor to operate a hydraulic pump that feeds fluid into the accumulator. This reduces the volume of traffic required to cross the system to generate electricity and increases the efficiency of the overall unit. Additionally, the solar panel can be used to power a security alarm on the power plant/generation house.

The overall system is a closed modular designed unit. The road plate can be divided into sections. The system can be pre-assembled on a 10'×8' skid which would include the accumulator, hydraulic motor and generator. The road plate can be installed in sections with minimal cuts to the roadway and conforms to profile of the road.

Methods for Generating Electricity Using System.

The method of the present invention, in a preferred embodiment, may comprise the steps of driving a vehicle over a road plate having one or more steps or arms with electric hydraulic cylinders having varying weight handling capacities disposed within them that are actuated when a vehicle travels over the road plate, and having a vehicle weight sensor system that activates one or more of the specific electrical hydraulic cylinders depending on the vehicle weight sensed by the sensor system; transferring the hydraulic pressure created by the electric hydraulic cylinders when a vehicle travels over the road plate from the electric hydraulic cylinders to a power generation system comprising one or more accumulators connected by hydraulic fluid supply lines to the electric hydraulic cylinders to receive and store pressurized hydraulic fluid supplied by the electric hydraulic cylinders, a hydraulic motor driven by pressurized hydraulic fluid supplied by the accumulators and an electricity generator driven by the hydraulic motor to generate electricity.

The present invention can be designed to capture as much energy as possible from each vehicle, including light passenger vehicles to buses and heavy trucks. Preferred locations for installation may include parking garages, shopping center or recreation/amusement park parking lots and similar locations with relatively steady vehicle traffic.

Vehicles on the road have widely varying weights and because the front axle weights versus rear axle weights of vehicles differ substantially, the present invention can capture the energy supplied at many different pressures. The use of dual accumulators each receiving hydraulic fluid from cylinders of different weight handling capacities as activated by the vehicle weight sensing system allow for greater energy harnessing. If a single accumulator is used, a substantial fraction (more than half) of the energy potential of larger vehicles is lost because the accumulator would have to be operated at a low pressure in order to store the energy from smaller vehicles. The present invention provides further efficiency by use of a gear type flow divider to decrease the flow rate but increase the pressure delivered by the lighter vehicles. In sample calculations, overall efficiency of the accumulators in gathering the energy is estimated at approximately 70%, based on a weighted average of the front and rear axle efficiencies of the different sized vehicles.

While the present invention has been shown and described herein in what is considered to be a preferred embodiment thereof, illustrating the results and advantages over the prior art obtained through the present invention, the invention is not limited to the specific embodiments described above. Thus, the forms of the invention shown and described herein are to be taken as illustrative and other embodiments may be selected without departing from the spirit and scope of the present invention.

The embodiments described with reference to the Figures are exemplary only, and many other comparable configurations will be apparent to one of ordinary skill in the art Embodiments of the invention as described herein have significant advantages over previously developed implementations. As will be apparent to one of ordinary skill in the art, other similar apparatus arrangements are possible within the general scope of the invention. The embodiments described above are intended to be exemplary rather than limiting and the bounds of the invention should be determined from the claims.

What is claimed is:

1. A power generation system comprising:
   a hydraulic accumulator coupled to a hydraulic motor;
   a hydraulic reservoir;
   at least one electric hydraulic cylinder having a lower weight-handling capacity coupled to the accumulator and further coupled to the hydraulic reservoir;
   at least one electric hydraulic cylinder having a higher weight-handling capacity coupled to the accumulator and further coupled to the hydraulic reservoir;
   at least one flow director coupled to the at least one electric hydraulic cylinder having the higher weight-handling capacity; and
   a vehicle weight sensor coupled to the flow director.

2. The system of claim 1 wherein:
   the vehicle weight sensor comprises a solenoid.

3. The system of claim 1 wherein:
   the hydraulic motor is coupled to an electric power generator.

4. The system of claim 1 wherein:
   the vehicle weight sensor is operable to control the flow director in response to a sensed vehicle weight.

5. The system of claim 4 wherein:
   the flow director is operable to enable a hydraulic flow to at least one electric hydraulic cylinder having the higher weight-handling capacity in response to the vehicle weight being heavier and further operable to inhibit the hydraulic flow in response to the vehicle weight being lighter.

6. The system of claim 1 further comprising:
   A road plate coupled to the at least one electric hydraulic cylinder having the higher weight-handling capacity and further coupled to the at least one electric hydraulic cylinder having the lower weight-handling capacity.

7. The system of claim 5 further comprising:
   A road plate coupled to the at least one electric hydraulic cylinder having the higher weight-handling capacity and further coupled to the at least one electric hydraulic cylinder having the lower weight-handling capacity.

* * * * *